(12) United States Patent
Sebastian

(10) Patent No.: US 7,911,948 B2
(45) Date of Patent: Mar. 22, 2011

(54) METHODS AND SYSTEMS FOR PERFORMING TCP THROTTLE

(75) Inventor: William B. Sebastian, Quincy, MA (US)

(73) Assignee: ViaSat, Inc., Carlsbad, CA (US)

( * ) Notice: Subject to any disclaimer, the term of this patent is extended or adjusted under 35 U.S.C. 154(b) by 69 days.

(21) Appl. No.: 12/253,737

(22) Filed: Oct. 17, 2008

(65) Prior Publication Data

US 2009/0116503 A1 May 7, 2009

Related U.S. Application Data

(60) Provisional application No. 60/980,734, filed on Oct. 17, 2007.

(51) Int. Cl.
*H04L 12/54* (2006.01)
*H04L 12/56* (2006.01)
(52) U.S. Cl. .................. 370/230.1; 370/429; 709/203; 709/232
(58) Field of Classification Search .................. None
See application file for complete search history.

(56) References Cited

U.S. PATENT DOCUMENTS

| | | | | |
|---|---|---|---|---|
| 6,006,266 A * | 12/1999 | Murphy et al. | ............... | 709/227 |
| 6,049,820 A * | 4/2000 | Murphy et al. | ............... | 709/203 |
| 6,092,115 A * | 7/2000 | Choudhury et al. | .......... | 709/235 |
| 6,222,823 B1 * | 4/2001 | Smith et al. | .................. | 370/230 |
| 6,233,250 B1 * | 5/2001 | Liu et al. | ...................... | 370/469 |
| 6,505,253 B1 * | 1/2003 | Chiu et al. | .................... | 709/235 |
| 6,715,007 B1 * | 3/2004 | Williams et al. | ................ | 710/52 |
| 6,760,303 B1 * | 7/2004 | Brouwer | ....................... | 370/229 |
| 6,785,768 B2 * | 8/2004 | Peters et al. | .................. | 711/112 |
| 6,845,398 B1 * | 1/2005 | Galensky et al. | ............. | 709/231 |
| 6,983,324 B1 * | 1/2006 | Block et al. | ................... | 709/228 |
| 7,149,186 B1 * | 12/2006 | Hey | ............................ | 370/232 |
| 7,209,437 B1 * | 4/2007 | Hodgkinson et al. | ........ | 370/230 |
| 7,418,001 B2 * | 8/2008 | Yun et al. | ...................... | 370/412 |
| 7,426,181 B1 * | 9/2008 | Feroz et al. | .................... | 370/232 |
| 7,460,473 B1 * | 12/2008 | Kodama et al. | .............. | 370/230 |
| 7,583,600 B1 * | 9/2009 | Schanke et al. | ............... | 370/235 |
| 7,627,702 B2 * | 12/2009 | Iwatsu | ............................ | 710/68 |
| 7,650,421 B2 * | 1/2010 | Patrick et al. | ................. | 709/231 |
| 7,676,597 B2 * | 3/2010 | Kagan et al. | .................. | 709/240 |
| 2002/0156927 A1 * | 10/2002 | Boucher et al. | .............. | 709/250 |
| 2003/0053475 A1 * | 3/2003 | Veeraraghavan et al. | ..... | 370/431 |
| 2007/0110046 A1 * | 5/2007 | Farrell et al. | .................. | 370/389 |
| 2008/0091868 A1 * | 4/2008 | Mizrachi et al. | ............. | 710/263 |
| 2009/0073884 A1 * | 3/2009 | Kodama et al. | .............. | 370/235 |

* cited by examiner

*Primary Examiner* — Gregory B Sefcheck
(74) *Attorney, Agent, or Firm* — Kilpatrick Townsend & Stockton LLP

(57) ABSTRACT

The present invention relates to systems and methods of accelerating network traffic. The method includes receiving a plurality of network packets and setting a threshold for a buffer. The threshold indicates a low water mark for the buffer. The method further includes storing the plurality of network packets in the buffer at least until the buffer's capacity is full, removing packets from the buffer, and transmitting the removed packets via a downstream link to an associated destination. Furthermore, the method includes that in response to removing packets from the buffer such that the buffer's capacity falls below the threshold, receiving additional packets and storing the additional packets at least until the buffer's capacity is full.

18 Claims, 6 Drawing Sheets

METHODS AND SYSTEMS FOR PERFORMING TCP THROTTLE

RELATED APPLICATIONS

This application claims priority to U.S. Provisional Patent Application Ser. No. 60/980,734, filed Oct. 17, 2007, entitled "METHODS AND SYSTEMS FOR PERFORMING TCP THROTTLE", which is hereby incorporated by reference herein in its entirety for any purpose.

FIELD OF THE INVENTION

The present invention relates, in general, to cache modeling and, more particularly, to cache modeling in a prefetching system.

BACKGROUND

A network optimizer can improve the performance of a network by reducing the number of bytes sent across the link via data compression or delta coding. In this situation, the optimizer may receive packets from a server via a fast link, compress the packets, and then send the packets across a slow link to a partner optimizer. The partner optimizer than uncompresses the data and forwards the restored (decompressed) data to a client application. The compressing optimizer is capable of receiving data much faster than the slow link is able to accept the resulting compressed data. If it accepts too much data, the applications may not perform correctly because, for example, the application server may set timers based on when it emitted the data. Furthermore, if the application does not accept data fast enough, the low bandwidth link may not be fully utilized, hence reducing performance. Hence, systems and methods needed to regulate the speed at which the compressing optimizer accepts data from the application server so as to optimize data transfer rates without interfering with application performance.

BRIEF SUMMARY

Embodiments of the present invention are directed to a method of accelerating network traffic. The method includes receiving a plurality of network packets and sending the packets to an optimizing module which compresses the data or performs other optimization techniques. The output of the optimizer is sent to a buffer. Packets are removed from this buffer and transmitted across a downstream link at the maximum rate that this downstream link can accept the compressed data. A threshold is set specifying a low water mark for the amount of data in this buffer. As long as the amount of data is less than this threshold, the optimizer continues to accept new packets at the maximum rate that it can receive and process the application data. When this threshold is exceeded, a signal is sent to the connections over which input data is received, which tells the connections to stop accepting new data. When sufficient packets are removed from the buffer to reduce the amount of data below the low water mark, a signal is sent to the connections that enables then to resume receiving input packets.

In a further embodiment, a system for accelerating network traffic is described. The system includes a client configured to generate requests for a plurality of packets. The system further includes a proxy server connected with the client. The proxy server is configured to receiving the plurality of packets and set a threshold for a buffer. The threshold indicates a low water mark for the buffer. The proxy server is further configured to store the plurality of packets in the buffer at least until the buffer's capacity is full, remove packets from the buffer, and transmit the removed packets via a downstream link to the client. Further, the proxy server is configured to, in response to removing packets from the buffer such that the buffer's capacity falls below the threshold, receive additional packets and store the additional packets at least until the buffer's capacity is full.

In an alternative embodiment, a machine-readable medium is described. The machine-readable medium includes instructions for accelerating network traffic. The machine-readable medium includes instructions for receiving a plurality of network packets and setting a threshold for a buffer. The threshold indicates a low water mark for the buffer. The machine-readable medium further includes instructions for storing the plurality of network packets in the buffer at least until the buffer's capacity is full, removing packets from the buffer, and transmitting the removed packets via a downstream link to an associated destination. Furthermore, the machine-readable medium includes instructions for, in response to removing packets from the buffer such that the buffer's capacity falls below the threshold, receiving additional packets and storing the additional packets at least until the buffer's capacity is full.

BRIEF DESCRIPTION OF THE DRAWINGS

A further understanding of the nature and advantages of the present invention may be realized by reference to the remaining portions of the specification and the drawings wherein like reference numerals are used throughout the several drawings to refer to similar components. In some instances, a sub-label is associated with a reference numeral to denote one of multiple similar components. When reference is made to a reference numeral without specification to an existing sub-label, it is intended to refer to all such multiple similar components.

DETAILED DESCRIPTION OF THE INVENTION

Figure 1:
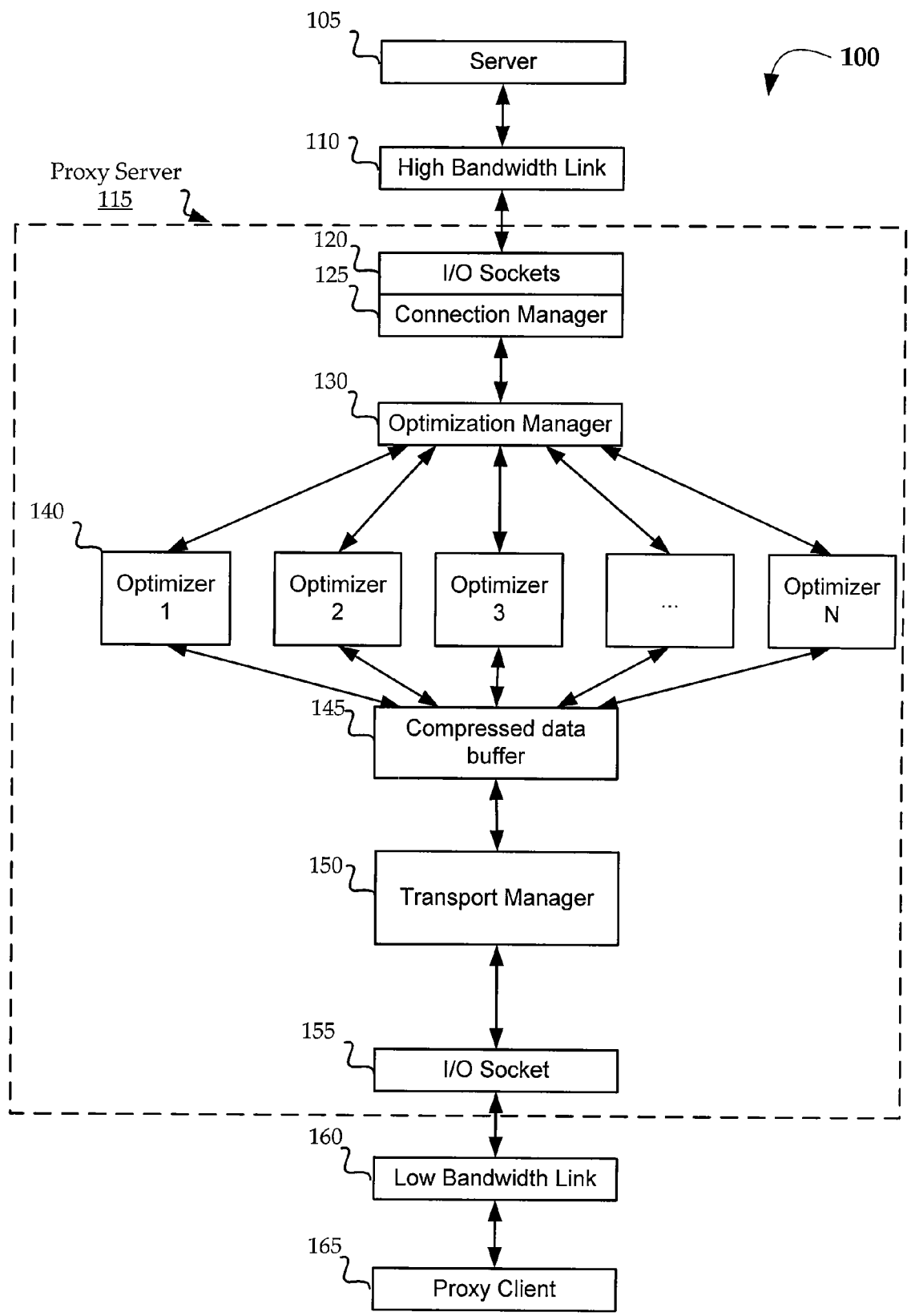
FIG. 1 is a block diagram illustrating a system for performing TCP throttle operations, according to embodiments of the present invention.

While various aspects of embodiments of the invention have been summarized above, the following detailed description illustrates exemplary embodiments in further detail to enable one of skill in the art to practice the invention. In the following description, for the purposes of explanation, numerous specific details are set forth in order to provide a thorough understanding of the present invention. It will be apparent, however, to one skilled in the art that the present invention may be practiced without some of these specific details. In other instances, well-known structures and devices are shown in block diagram form. Several embodiments of the invention are described below and, while various features are ascribed to different embodiments, it should be appreciated that the features described with respect to one embodiment may be incorporated with another embodiment as well. By the same token, however, no single feature or features of any described embodiment should be considered essential to the invention, as other embodiments of the invention may omit such features.

Aspects of the disclosure relate to accelerating transport of network traffic. For example, in many network configurations, a server (e.g., a file server, a web server, etc.) may have a high bandwidth link (e.g., T1 link, cable link, digital subscriber line (DSL), etc.) with a proxy server. In contrast, the link between the proxy server and a proxy client may be a low bandwidth link (e.g., dial-up, satellite link, mobile link, cellular link, etc.). Consequently, with such a network configuration the high bandwidth link is able to transmit data at a faster rate than the low bandwidth link can accept. Accordingly, a buffer is placed at the proxy server, and packets are flushed from this buffer at the rate at which they can be accepted by the low bandwidth link.

Furthermore, a compression engine or other processing module may be placed between the high speed link and the buffer which reduces the number of bytes written into the buffer to a number less than that received from the high speed link. This compression engine or processing device may also be configured to accumulate input packets in order to optimize its compression or other optimization functions. As a result, the amount of data written into the buffer and the timing at which the packets arrive may be different from both the rate and timing at which packets are received from the high speed link and the rate and timing at which the data is sent to the low bandwidth link. Thus, there are three asynchronous processes taking place: the receipt of the input data from the high bandwidth link; the processing of this data in the compression engine and optimization modules; and the rate at which the data is emitted across the low bandwidth link.

Accordingly, each of these three processes may have their own timing requirements. The data may be configured to be sent across the low bandwidth link as quickly as the link can accept it, and not be delayed by waiting for new data from the compression engine. In one embodiment, the compression engine may be configured to be able to collect large blocks of input data to optimize its operation, and then be able to emit smaller blocks of data to the buffer at various times. In a further embodiment, the interface to the high speed link may be configured to accept data at a sufficiently continuous rate in order to avoid "time-outs" in the application processes and at a rate fast enough to supply the data as quickly as needed by the compression engine.

Turning now to FIG. 1 which illustrates a system 100 according to aspects of the present invention. According to one embodiment, system 100 may include a server 105, a proxy server 115 and a proxy client 165. In one embodiment, server 105 may be a file server, a web server, a file transfer protocol (FTP) server, a mail server, etc. As such, server 105 may be associated with a variety of applications which implement a variety of protocols. Furthermore, server 105 may be connected with proxy server 115 via a high bandwidth link 110. In one embodiment, high bandwidth link 110 is a broadband link, a cable modem link, a DSL connection, a T1 connection, etc.

In one embodiment, server 105 may receive a request for a web page from proxy client 165 through proxy server 115. The web page may include, for example, an image file, a flash file, and a cascading style sheet (CSS). In response to the request, server 105 may begin transmitting packets of data which include the content of the requested web page. In one embodiment, proxy server 115 may include a connection manager 125 which manages the connection's proxy server 115 has with various servers (e.g., server 105). In response to proxy server 115 receiving data packets from server 105, connection manager 125 may create and manage corresponding input/output (I/O) sockets 120 to handle the incoming data.

In one embodiment, connection manager 125 creates a transmission control protocol (TCP) socket based on server 105 being a web server; however, other socket types may be created. In a further embodiment, proxy server 115 may include an optimization manager 130 which may control optimizers 140 which perform data compression and other optimization of the incoming data. In one embodiment, optimizers 140 may write their output into compressed data buffer 145. In this example, only one socket has been created; however, multiple sockets and optimizers may be created and managed by optimization manager 130.

In one embodiment, optimization manager 130 may manage different optimizer modules supporting different application protocols, such as HTTP, FTP, Simple Message Block (SMB), Messaging Application Programming Interface (MAPI), Remote Procedure Call (RPC), etc. In one embodiment, individual optimizer modules may use various compression algorithms and other techniques to reduce the number of bytes that need to be transferred across the low bandwidth link.

For example, the image file received from the web page requested may use an image encoder to compress the image file. In contrast, the flash file from the web page may use a Shockwave file (SWF) compression algorithm. Nonetheless, other compression algorithms may be used, such as, a command coder, a generic coder, an in-memory delta coder, a persistent delta coder, an imager coder (e.g., Graphics Interchange Format (GIF), Joint Photographic Experts Group (JPG), Portable Network Graphics (PNG), Bitmap (BMP), etc.), Microsoft™ Office encoder, etc.

In a further embodiment, the compressed packet data may be retrieved by Intelligent Compression Technology's™ (ICT) Transport Protocol (ITP)™ transport manager 150. Transport manager 150 buffers the data received from server 105 and re-packets the data to be transferred efficiently to I/O socket 155. In one embodiment, I/O socket 155 transmits the ITP packets via low bandwidth link 160 to proxy client 165. Furthermore, transport manager 150 may be configured to receive data from multiple sockets and transmit data out using a single I/O socket 155.

It should be noted that system 100 is symmetrical, such that traffic may be transmitted in both directions (i.e., both upstream and downstream). Furthermore, any description of embodiments of the invention should be construed as being able to work semantically.

Figure 2:
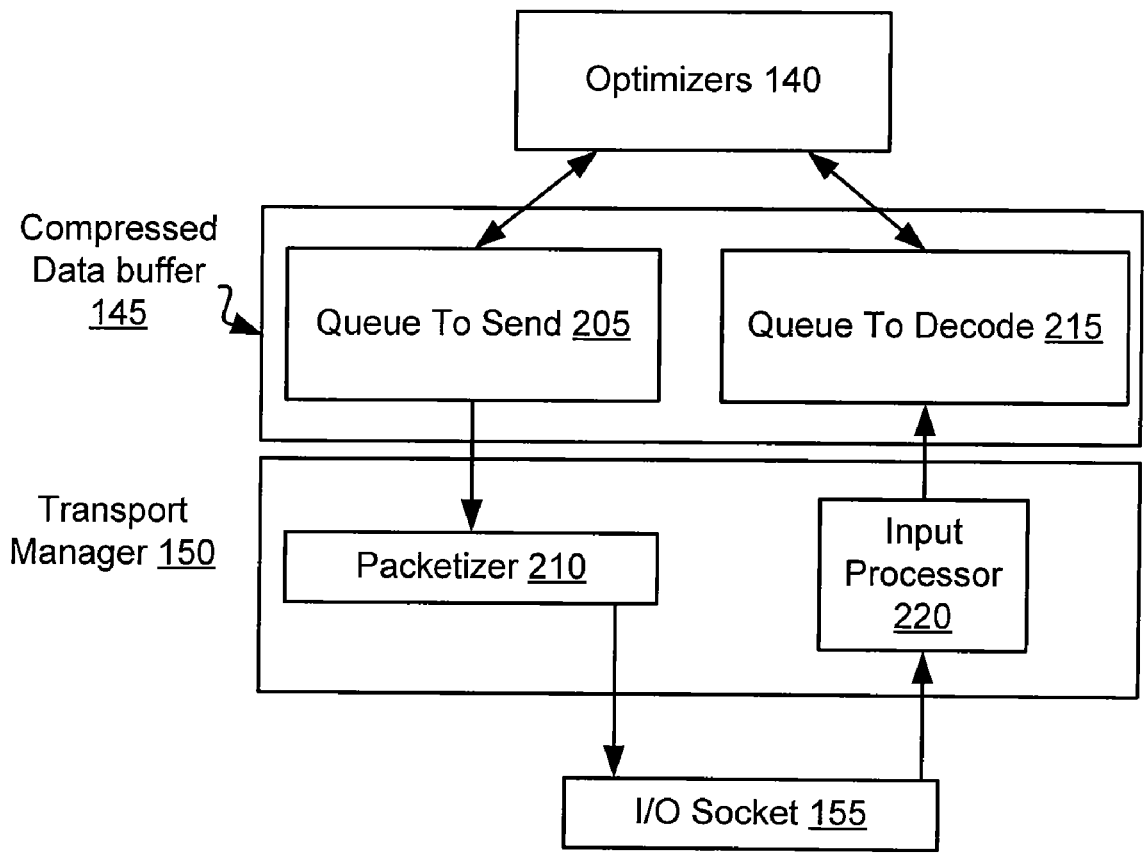
FIG. 2 is a block diagram illustrating a data compression buffer, according to embodiments of the present invention.

Referring now to FIG. 2 which illustrates one embodiment of compressed data buffer 145 and transport manager 150 according to aspects of the present invention. In one embodiment, both of these modules can support sending and receiving of input data, so that input data may be added to queue to send 205, and then retrieved by the packetizer 210. Similarly, data arriving from the low bandwidth link may be accepted by an input processor 220 and placed into queue to decode 215. In one embodiment, queue to send 205 acts as a buffer to store data packets as they are received. In one embodiment, a threshold or low water mark may be set for queue to send 205. The threshold may be used to regulate how low queue to send 205 can get before additional packets need to be added back into the queue. Thus, the threshold may only allow the queue to get down to, for example, three-quarters full before the queue begins adding more packets. Consequently, the queue (or buffer) in queue to send 205 may consistently be maintained at least above a low water mark based on the threshold. Additionally, each time a packet is added into the queue, the server sending the packets receives an acknowledgment packet indicating that the packet was successfully received. Furthermore, the threshold may be set based on a variety of factors.

In one embodiment, the variety of factors may include, for example, the bandwidth of low bandwidth link 160 (FIG. 1), the compression algorithm used, the application and/or protocol time out interval, etc. The bandwidth of low bandwidth link 160 (FIG. 1) may be determined using the techniques described in U.S. Provisional Patent Application No. 60/949, 495, entitled METHODS AND SYSTEMS FOR BANDWIDTH MEASUREMENT, filed on Jul. 12, 2007, which is incorporated by reference for any and all purposes. The bandwidth of low bandwidth link 160 (FIG. 1) may be used as a factor to determine the threshold because the rate at which low bandwidth link 160 (FIG. 1) can transport packets affects the rate at which the queue can receive new packets. For example, on a fast link, more data may be needed to be maintained in the queue to insure that packets are always available to be sent if the rate varies at which the input data is received from high bandwidth link 110 (FIG. 1) and/or is processed by optimizers 140.

In a further embodiment, the compression algorithm used to compress the packet data before the data is received by queue to send 205 can affect the rate at which the queue should be discharged and refilled (i.e., the threshold). For example, if the compression algorithm parses large blocks before emitting data, the data may arrive at compressed data buffer 145 (FIG. 1) intermittently, so that the threshold needs to be larger in order to insure that data is always available when the low bandwidth link is ready to receive more data.

In one embodiment, the high speed connection to the application server may need to be "kept alive" indefinitely. If all of the data in a large block is accepted by I/O socket 155, the server may expect to receive an application-layer response from the client application acknowledging the receipt. In one embodiment, if the compressed data is waiting in compressed data buffer 145 (FIG. 1) because of delays in sending it across the low bandwidth link, the application will not send a response. This may cause the application server to cancel the session, which may not be advantageous. Thus, to avoid this, the threshold controlling the amount of data in the queue may need to be kept sufficiently low so that the time needed to discharge the data below this threshold is less than this "time-out" interval for the server. Thus, a determination may need to be made as to how long a connection can be maintained in an idle state without being terminated and, in response, the threshold should be set taking that into consideration. The amount of time that the high-speed link will be idle may equal the threshold divided by the bandwidth of the low-bandwidth link. The threshold should be set low enough so that the length of time is less than the application "time-out" interval.

In a further embodiment, transport manager 150 may include packetizer 210 connected with queue to send 205. Packetizer 210 may be configured to receive multiple packets from queue to send 205, coalesce the data into a single packet, and then format the data with appropriate headers (e.g., User Datagram Protocol (UDP) headers, TCP headers, etc.) for transfer to client proxy 165 (FIG. 1). The newly packetized packets can then be transmitted to I/O socket 155 for transport to proxy client 165 (FIG. 1).

In one embodiment, transport manager 150 may further include queue to decode 215. Queue to decode 215 may be configured to receive response packets from client proxy 165 (FIG. 1) via input processor 220. In one embodiment, no thresholds are needed to regulate queue to decode 215. These packets can be retrieved as quickly as possible by optimizers 140 (FIG. 1), which may then decode the data and upload it to the application server.

Accordingly, regulation of high bandwidth link 110 (FIG. 1) may be based on what occurs at the low bandwidth link 160 (FIG. 1). Furthermore, the regulating of the high bandwidth link 110 (FIG. 1) may be based on the queue and the threshold value associated with the queue. Additionally, the threshold value may be dependent on the bandwidth of low bandwidth link 160 (FIG. 1), the time out value of the application and the compression algorithm used.

In an alternative embodiment, the size of queue to decode 215 can be monitored for backlogs due to the inability of the optimizers to decode the data as fast as it is received. A low water mark can be established for this queue, which if exceeded can cause a signal to be sent back to the partner via the transport manager for the low bandwidth link. When the partner receives this signal, it can throttle back its emission rate using the same methods used in response to changes in its compressed data buffer. In this alternative implementation, the rate at which an optimizer accepts data from the high speed link is limited by both the amount of data in the compressed data buffer as well as the ability of the partner process to accept the data.

Figure 3:
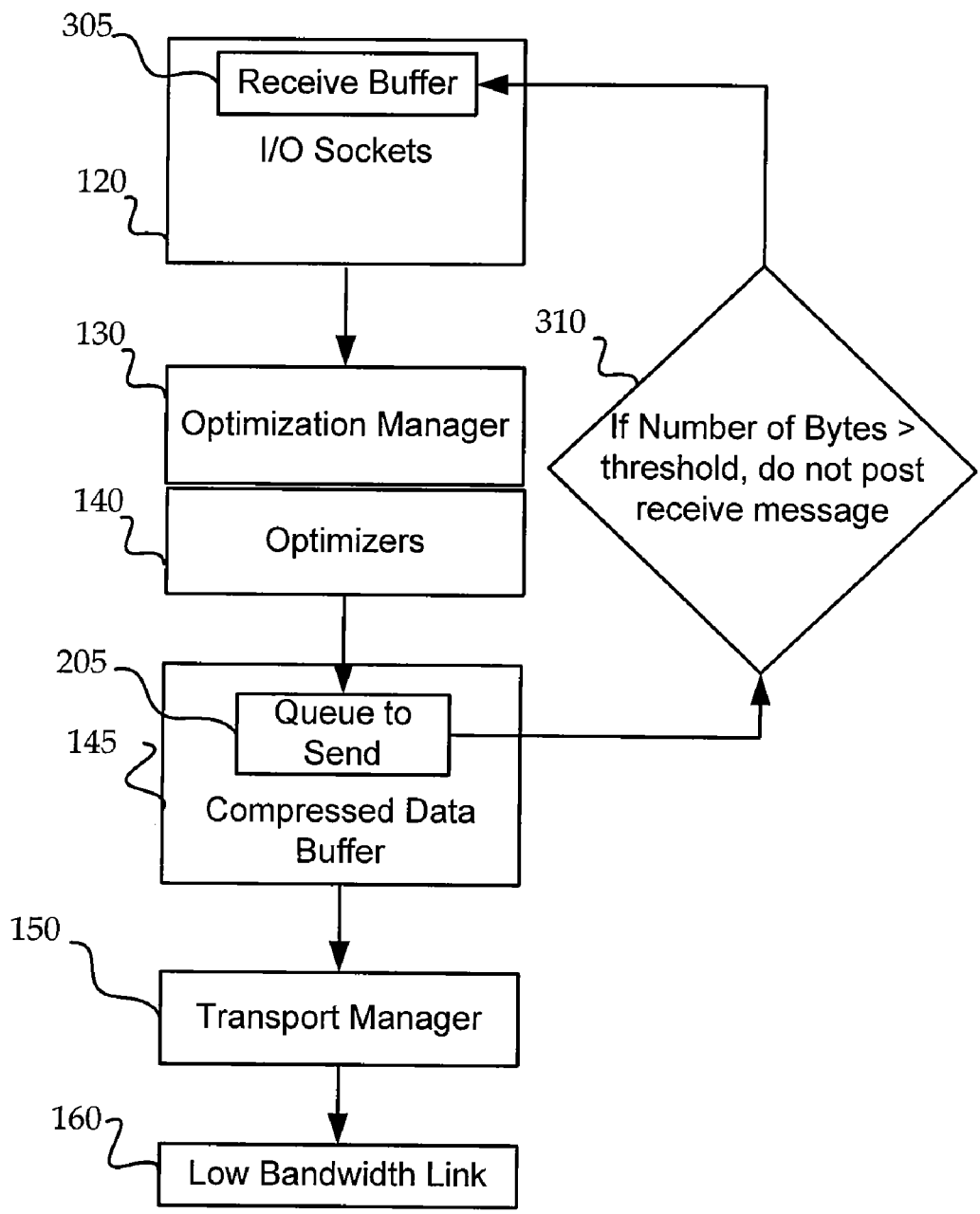
FIG. 3 is a flow diagram illustrating maintaining a threshold for a queue, according to embodiments of the present invention.

FIG. 3 describes one embodiment of a flow diagram for maintaining the threshold for queue to send 205 according to aspects of the present invention. In one embodiment, packets are received at a receive buffer 305 which May be part of I/O socket 120. As described above with respect to FIG. 1, optimization manager 130 and optimizers 140 may process the incoming packets and forward them to queue to send 205 in the compressed data buffer 145.

In one embodiment, queue to send 205 may receive packets and check its capacity to determine if the number of bytes of the packets within its queue is greater than the threshold value (process block 310). In one embodiment, if it is determined that the number of bytes is greater than the threshold value, then receive buffers are not posted within I/O socket 120. If a receive buffer is not supplied, the incoming TCP packets may not be accepted and may be retransmitted later by the application server. Hence, queue to send 205 may stop the flow of incoming data at I/O socket 120 until the number of bytes in the queue is less than the threshold, at which point, queue to send 205 may post a receive buffer 305 and begin accepting new data again. Alternatively, many other methods of throttling I/O socket 120 may be used, for example, I/O socket 120 may be throttled by adjusting the send queue. In response, the server may send additional packets which may, in turn, raise the level of bytes in the queue. Accordingly, the queue level can be maintained at least above the threshold (or low water mark) in order to efficiently transmit data between the server 105 (FIG. 1) and the client proxy 165 (FIG. 1).

Furthermore, one additional benefit of method 300 is that a "fairness" policy is created for any multiplexing which occurs among the multiple sockets. For example, for each block/unblock cycle, each socket is able to fill up one buffer, which means that if one socket is attempting to download a large file the individual socket does not block the other sockets.

Figure 4:
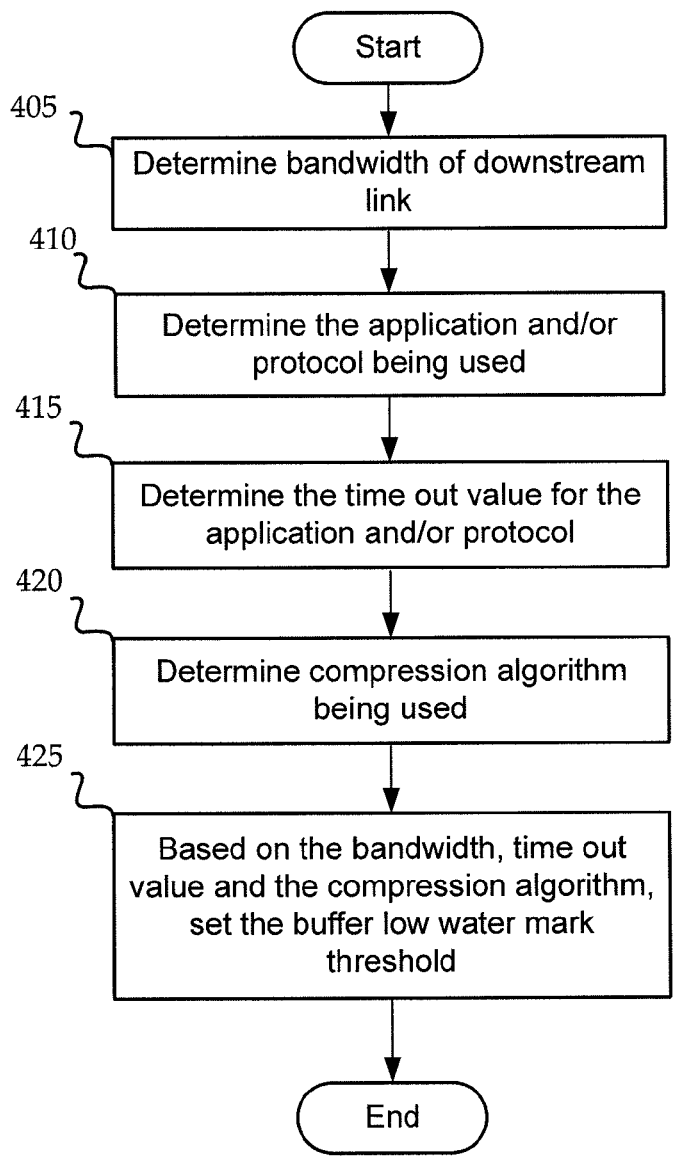
FIG. 4 is a flow diagram illustrating a method for determination of a threshold value for a queue, according to embodiments of the present invention.

Referring now to FIG. 4 which illustrates method 400 for determination of the threshold value for the queue of FIGS. 1 and 2 according to aspects of the present invention. At process block 405, the bandwidth of the downstream link (e.g., the link between a proxy client and a proxy server) is determined. Furthermore, at process block 410, the application and/or protocol associated with the packets being received is determined.

At process block 415, the time out value associated with the application and/or protocol is determined. The compression algorithm used to compress the received packets may be determined (process block 420). At process block 425, based on the bandwidth of the downstream link, the time out value and the compression algorithm, the buffer's threshold or low water mark can be determined to most efficiently accelerate the downstream link. Furthermore, the optimum value of the threshold may be determined dynamically at process block 425. A larger threshold value improves performance by reducing the chances that the link is not fully utilized because of delays in processing more data or fluctuations in link performance. The threshold may however be kept small enough to avoid application timeouts. The time needed to discharge the buffer contents can be calculated as (maximum amount of data in the buffer)/Bandwidth, where bandwidth is the value calculated at process block 405. This time may be less than the application timeout value estimated at process block 415. The timeout value is the length of time before the application server determines that a download has failed because it has sent all the data in a file but has not yet received an application layer acknowledgement from the client. This value may be different for different applications.

To the extent that the application is known at process block 410 and the application's characteristics are established at process block 415, the appropriate value may be used in the equation. The maximum amount of data in the buffer is the sum of the threshold plus the maximum amount of extra data that may be added after the throttle has been invoked. This may be a factor of the compression algorithm determined at process block 420 as well as the size of the input buffers. For example, the compression system and buffers might be implemented so as to send a maximum of another 64,000 bytes of extra data after the throttle has been closed. Substituting these values, the maximum threshold can be determined as: MaxThreshold=(TimeOutValue*Bandwidth)−ExtraData. This value can be adjusted dynamically in response to changes in bandwidth, the applications in use, or compression performance.

Figure 5:
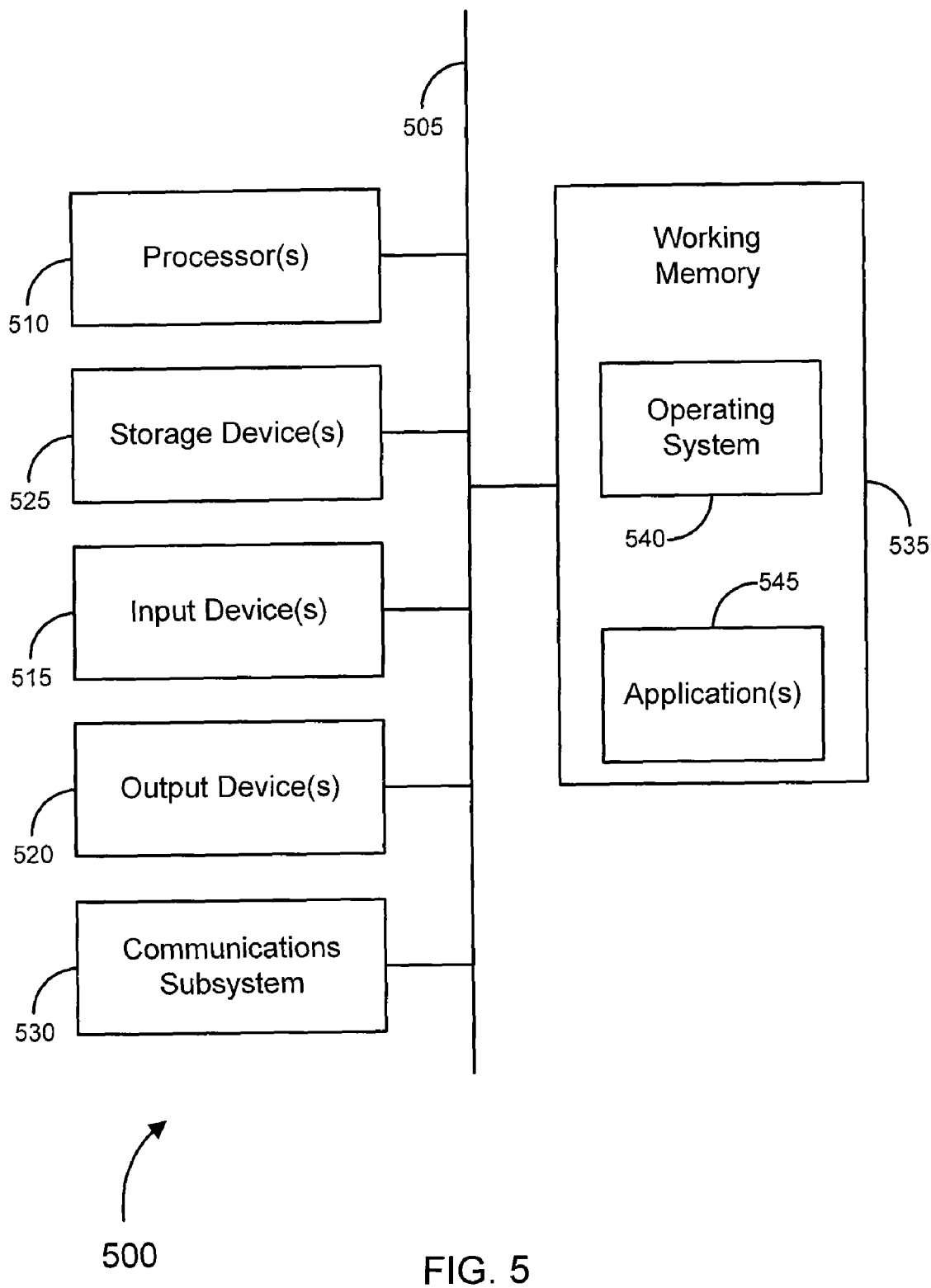
FIG. 5 is a generalized schematic diagram illustrating a computer system, in accordance with various embodiments of the invention.

FIG. 5 provides a schematic illustration of one embodiment of a computer system 500 that can perform the methods of the invention, as described herein, and/or can function, for example, as any part of client 205 or proxy server 220 of FIG. 2. It should be noted that FIG. 5 is meant only to provide a generalized illustration of various components, any or all of which may be utilized as appropriate. FIG. 5, therefore, broadly illustrates how individual system elements may be implemented in a relatively separated or relatively more integrated manner.

The computer system 500 is shown comprising hardware elements that can be electrically coupled via a bus 505 (or may otherwise be in communication, as appropriate). The hardware elements can include one or more processors 510, including without limitation one or more general-purpose processors and/or one or more special-purpose processors (such as digital signal processing chips, graphics acceleration chips, and/or the like); one or more input devices 515, which can include without limitation a mouse, a keyboard and/or the like; and one or more output devices 520, which can include without limitation a display device, a printer and/or the like.

The computer system 500 may further include (and/or be in communication with) one or more storage devices 525, which can comprise, without limitation, local and/or network accessible storage and/or can include, without limitation, a disk drive, a drive array, an optical storage device, solid-state storage device such as a random access memory ("RAM") and/or a read-only memory ("ROM"), which can be programmable, flash-updateable and/or the like. The computer system 500 might also include a communications subsystem 530, which can include without limitation a modem, a network card (wireless or wired), an infra-red communication device, a wireless communication device and/or chipset (such as a Bluetooth™ device, an 802.11 device, a WiFi device, a WiMax device, cellular communication facilities, etc.), and/or the like. The communications subsystem 530 may permit data to be exchanged with a network (such as the network described below, to name one example), and/or any other devices described herein. In many embodiments, the computer system 500 will further comprise a working memory 535, which can include a RAM or ROM device, as described above.

The computer system 500 also can comprise software elements, shown as being currently located within the working memory 535, including an operating system 540 and/or other code, such as one or more application programs 545, which may comprise computer programs of the invention, and/or may be designed to implement methods of the invention and/or configure systems of the invention, as described herein. Merely by way of example, one or more procedures described with respect to the method(s) discussed above might be implemented as code and/or instructions executable by a computer (and/or a processor within a computer). A set of these instructions and/or code might be stored on a computer readable storage medium, such as the storage device(s) 525 described above. In some cases, the storage medium might be incorporated within a computer system, such as the system 500. In other embodiments, the storage medium might be separate from a computer system (i.e., a removable medium, such as a compact disc, etc.), and or provided in an installation package, such that the storage medium can be used to program a general purpose computer with the instructions/code stored thereon. These instructions might take the form of executable code, which is executable by the computer system 500 and/or might take the form of source and/or installable code, which, upon compilation and/or installation on the computer system 500 (e.g., using any of a variety of generally available compilers, installation programs, compression/decompression utilities, etc.) then takes the form of executable code.

It will be apparent to those skilled in the art that substantial variations may be made in accordance with specific requirements. For example, customized hardware might also be used, and/or particular elements might be implemented in hardware, software (including portable software, such as applets, etc.), or both. Further, connection to other computing devices such as network input/output devices may be employed.

In one aspect, the invention employs a computer system (such as the computer system 500) to perform methods of the invention. According to a set of embodiments, some or all of the procedures of such methods are performed by the computer system 500 in response to processor 510 executing one or more sequences of one or more instructions (which might be incorporated into the operating system 540 and/or other code, such as an application program 545) contained in the working memory 535. Such instructions may be read into the working memory 535 from another machine-readable medium, such as one or more of the storage device(s) 525. Merely by way of example, execution of the sequences of instructions contained in the working memory 535 might cause the processor(s) 510 to perform one or more procedures of the methods described herein.

The terms "machine-readable medium" and "computer readable medium", as used herein, refer to any medium that participates in providing data that causes a machine to operate in a specific fashion. In an embodiment implemented using the computer system 500, various machine-readable media might be involved in providing instructions/code to processor(s) 510 for execution and/or might be used to store and/or carry such instructions/code (e.g., as signals). In many implementations, a computer readable medium is a physical and/or tangible storage medium. Such a medium may take many forms, including but not limited to, non-volatile media, volatile media, and transmission media. Non-volatile media includes, for example, optical or magnetic disks, such as the storage device(s) 525. Volatile media includes, without limitation dynamic memory, such as the working memory 535. Transmission media includes coaxial cables, copper wire and fiber optics, including the wires that comprise the bus 505, as well as the various components of the communication subsystem 530 (and/or the media by which the communications subsystem 530 provides communication with other devices). Hence, transmission media can also take the form of waves (including without limitation radio, acoustic and/or light waves, such as those generated during radio-wave and infra-red data communications).

Common forms of physical and/or tangible computer readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, an EPROM, a FLASH-EPROM, any other memory chip or cartridge, a carrier wave as described hereinafter, or any other medium from which a computer can read instructions and/or code.

Various forms of machine-readable media may be involved in carrying one or more sequences of one or more instructions to the processor(s) 510 for execution. Merely by way of example, the instructions may initially be carried on a magnetic disk and/or optical disc of a remote computer. A remote computer might load the instructions into its dynamic memory and send the instructions as signals over a transmission medium to be received and/or executed by the computer system 500. These signals, which might be in the form of electromagnetic signals, acoustic signals, optical signals and/or the like, are all examples of carrier waves on which instructions can be encoded, in accordance with various embodiments of the invention.

The communications subsystem 530 (and/or components thereof) generally will receive the signals, and the bus 505 then might carry the signals (and/or the data, instructions, etc., carried by the signals) to the working memory 535, from which the processor(s) 505 retrieves and executes the instructions. The instructions received by the working memory 535 may optionally be stored on a storage device 525 either before or after execution by the processor(s) 510.

Figure 6:
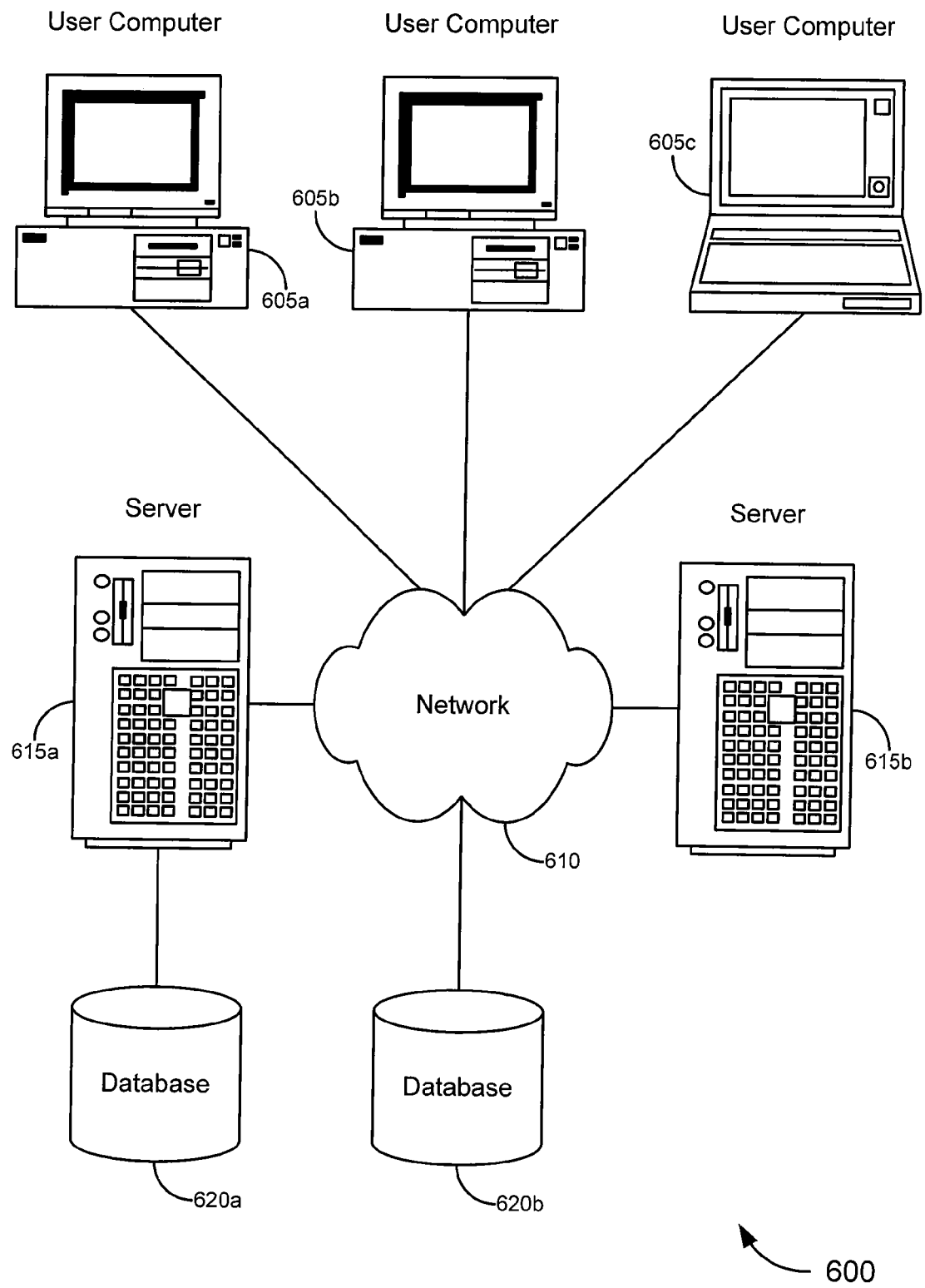
FIG. 6 is a block diagram illustrating a networked system of computers, which can be used in accordance with various embodiments of the invention.

A set of embodiments comprises systems for implementing TCP throttling. In one embodiment, proxy server 115 in FIG. 1, may be implemented as computer system 500 in FIG. 5. Merely by way of example, FIG. 6 illustrates a schematic diagram of a system 600 that can be used in accordance with one set of embodiments. The system 600 can include one or more user computers 605. The user computers 605 can be general purpose personal computers (including, merely by way of example, personal computers and/or laptop computers running any appropriate flavor of Microsoft Corp.'s Windows™ and/or Apple Corp.'s Macintosh™ operating systems) and/or workstation computers running any of a variety of commercially-available UNIX™ or UNIX-like operating systems. These user computers 605 can also have any of a variety of applications, including one or more applications configured to perform methods of the invention, as well as one or more office applications, database client and/or server applications, and web browser applications. Alternatively, the user computers 605 can be any other electronic device, such as a thin-client computer, Internet-enabled mobile telephone, and/or personal digital assistant (PDA), capable of communicating via a network (e.g., the network 610 described below) and/or displaying and navigating web pages or other types of electronic documents. Although the exemplary system 600 is shown with three user computers 605, any number of user computers can be supported.

Certain embodiments of the invention operate in a networked environment, which can include a network 610. The network 610 can be any type of network familiar to those skilled in the art that can support data communications using any of a variety of commercially-available protocols, including without limitation TCP/IP, SNA, IPX, AppleTalk, and the like. Merely by way of example, the network 610 can be a local area network ("LAN"), including without limitation an Ethernet network, a Token-Ring network and/or the like; a wide-area network (WAN); a virtual network, including without limitation a virtual private network ("VPN"); the Internet; an intranet; an extranet; a public switched telephone network ("PSTN"); an infra-red network; a wireless network, including without limitation a network operating under any of the IEEE 802.11 suite of protocols, the Bluetooth™ protocol known in the art, and/or any other wireless protocol; and/or any combination of these and/or other networks.

Embodiments of the invention can include one or more server computers 615. Each of the server computers 615 may be configured with an operating system, including without limitation any of those discussed above, as well as any commercially (or freely) available server operating systems. Each of the servers 615 may also be running one or more applications, which can be configured to provide services to one or more clients 605 and/or other servers 615.

Merely by way of example, one of the servers 615 may be a web server, which can be used, merely by way of example, to process requests for web pages or other electronic documents from user computers 605. The web server can also run a variety of server applications, including HTTP servers, FTP servers, CGI servers, database servers, Java™ servers, and the like. In some embodiments of the invention, the web server may be configured to serve web pages that can be operated within a web browser on one or more of the user computers 605 to perform methods of the invention.

The server computers 615, in some embodiments, might include one or more application servers, which can include one or more applications accessible by a client running on one or more of the client computers 605 and/or other servers 615. Merely by way of example, the server(s) 615 can be one or more general purpose computers capable of executing programs or scripts in response to the user computers 605 and/or other servers 615, including without limitation web applications (which might, in some cases, be configured to perform methods of the invention). Merely by way of example, a web application can be implemented as one or more scripts or programs written in any suitable programming language, such as Java™, C, C#™ or C++, and/or any scripting language, such as Perl, Python, or TCL, as well as combinations of any programming/scripting languages. The application server(s) can also include database servers, including without limitation those commercially available from Oracle™, Microsoft™, Sybase™, IBM™ and the like, which can process requests from clients (including, depending on the configurator, database clients, API clients, web browsers, etc.) running on a user computer 605 and/or another server 615. In some embodiments, an application server can create web pages dynamically for displaying the information in accordance with embodiments of the invention. Data provided by an application server may be formatted as web pages (comprising HTML, Javascript, etc., for example) and/or may be forwarded to a user computer 605 via a web server (as described above, for example). Similarly, a web server might receive web page requests and/or input data from a user computer 605 and/or forward the web page requests and/or input data to an application server. In some cases a web server may be integrated with an application server.

In accordance with further embodiments, one or more servers 615 can function as a file server and/or can include one or more of the files (e.g., application code, data files, etc.) necessary to implement methods of the invention incorporated by an application running on a user computer 605 and/or another server 615. Alternatively, as those skilled in the art will appreciate, a file server can include all necessary files, allowing such an application to be invoked remotely by a user computer 605 and/or server 615. It should be noted that the functions described with respect to various servers herein (e.g., application server, database server, web server, file server, etc.) can be performed by a single server and/or a plurality of specialized servers, depending on implementation-specific needs and parameters.

In certain embodiments, the system can include one or more databases 620. The location of the database(s) 620 is discretionary: merely by way of example, a database 620a might reside on a storage medium local to (and/or resident in) a server 615a (and/or a user computer 605). Alternatively, a database 620b can be remote from any or all of the computers 605, 615, so long as the database can be in communication (e.g., via the network 610) with one or more of these. In a particular set of embodiments, a database 620 can reside in a storage-area network ("SAN") familiar to those skilled in the art. (Likewise, any necessary files for performing the functions attributed to the computers 605, 615 can be stored locally on the respective computer and/or remotely, as appropriate.) In one set of embodiments, the database 620 can be a relational database, such as an Oracle™ database, that is adapted to store, update, and retrieve data in response to SQL-formatted commands. The database might be controlled and/or maintained by a database server, as described above, for example.

While the invention has been described with respect to exemplary embodiments, one skilled in the art will recognize that numerous modifications are possible. For example, the methods and processes described herein may be implemented using hardware components, software components, and/or any combination thereof. Further, while various methods and processes described herein may be described with respect to particular structural and/or functional components for ease of description, methods of the invention are not limited to any particular structural and/or functional architecture but instead can be implemented on any suitable hardware, firmware and/or software configurator. Similarly, while various functionalities are ascribed to certain system components, unless the context dictates otherwise, this functionality can be distributed among various other system components in accordance with different embodiments of the invention.

Moreover, while the procedures comprised in the methods and processes described herein are described in a particular order for ease of description, unless the context dictates otherwise, various procedures may be reordered, added, and/or omitted in accordance with various embodiments of the invention. Moreover, the procedures described with respect to one method or process may be incorporated within other described methods or processes; likewise, system components described according to a particular structural architecture and/or with respect to one system may be organized in alternative structural architectures and/or incorporated within other described systems. Hence, while various embodiments are described with—or without—certain features for ease of description and to illustrate exemplary features, the various components and/or features described herein with respect to a particular embodiment can be substituted, added and/or subtracted from among other described embodiments, unless the context dictates otherwise. Consequently, although the invention has been described with respect to exemplary embodiments, it will be appreciated that the invention is intended to cover all modifications and equivalents within the scope of the following claims.

What is claimed is:

1. A method of accelerating network traffic, the method comprising:
receiving a plurality of network packets;
selecting an application from multiple applications associated with the plurality of packets, wherein the selected application includes an associated packet time-out value;
setting a threshold for a buffer at a level sufficient to allow for the transmitting of acknowledgements often enough to be transmitted within the associated time-out value of the selected application, wherein the threshold indicates a low water mark for the buffer, and wherein the buffer comprises a maximum capacity for storing network packets;
storing the plurality of network packets in the buffer at least above the low water mark threshold and below the maximum capacity;
removing packets from the buffer;
transmitting the removed packets via a downstream link to an associated destination; and
in response to removing packets from the buffer such that the buffer's capacity falls below the low water mark threshold, receiving additional packets and storing the additional packets at least above the low water mark threshold and below the maximum capacity.

2. The method of accelerating network traffic of claim 1, further comprising that prior to the storing of the plurality of packets in the buffer, compressing the packets.

3. The method of accelerating network traffic of claim 2, wherein the received packets are associated with two or more applications.

4. The method of accelerating network traffic of claim 3, wherein the two or more applications are associated with two or more protocols.

5. The method of accelerating network traffic of claim 4, wherein the two or more protocols are at least one of a hypertext transport protocol (HTTP), file transfer protocol (FTP), and simple message transport protocol (SMTP).

6. The method of accelerating network traffic of claim 2, further comprising after the removing the plurality of packets from the buffer, coalescing the removed packets into a plurality of full maximum transmission unit (MTU) size packets.

7. The method of accelerating network traffic of claim 2, wherein a compression algorithm is at least one of a command coder, a delta coder, and an image coder.

8. The method of accelerating network traffic of claim 1, wherein the setting of the threshold for the buffer comprises:
   determining the downstream link's bandwidth; and
   determining a compression algorithm used to compress the plurality of packets.

9. The method of accelerating network traffic of claim 1, wherein the downstream link's status is used to determine the buffer's threshold.

10. The method of accelerating network traffic of claim 1, further comprising:
    determining a bandwidth of a downstream link;
    determining a protocol being used on the downstream link;
    determining a time-out value associated with the protocol being used on the downstream link; and
    determining a compression algorithm being used on the downstream link.

11. The method of accelerating network traffic of claim 10, further comprising based on at least one of: the determined bandwidth, the determined time-out value, and the determined compression algorithm, setting the low watermark threshold of the buffer.

12. The method of accelerating network traffic of claim 11, wherein the protocol comprises one or more of the following: TCP, UDP, HTTP, FTP, and ITP.

13. A system for accelerating network traffic, the system comprising:
    a client configured to generate requests for a plurality of packets;
    a proxy server connected with the client, wherein the proxy server is configured to receive the plurality of packets, select an application from multiple applications associated with the plurality of packets, wherein the selected application includes an associated packet time-out value, set a threshold for a buffer at a level sufficient to allow for the transmitting of acknowledgements often enough to be transmitted within the associated time-out value of the selected application, wherein the threshold indicates a low water mark for the buffer, and wherein the buffer comprises a maximum capacity for storing network packets, store the plurality of packets in the buffer at least above the low water mark threshold and below the maximum capacity, remove packets from the buffer, transmit the removed packets via a downstream link to the client, and in response to removing packets from the buffer such that the buffer's capacity falls below the low water mark threshold, receive additional packets and store the additional packets at least above the low water mark threshold and below the maximum capacity.

14. The system for accelerating network traffic of claim 13, the system further comprising a content server coupled with the proxy server, the content server configured to transmit the plurality of packets to the proxy server.

15. The system for accelerating network traffic of claim 14, wherein the content server is one or more of the following types of servers: a web server, a mail server, a file server, and an FTP server.

16. A non-transitory machine-readable storage medium for accelerating network traffic, the machine-readable storage medium including sets of instructions stored thereon which, when executed by a machine, cause the machine to:
    receive a plurality of network packets;
    select an application from multiple applications associated with the plurality of packets, wherein the selected application includes an associated packet time-out value;
    set a threshold for a buffer at a level sufficient to allow for the transmitting of acknowledgements often enough to be transmitted within the associated time-out value of the selected application, wherein the threshold indicates a low water mark for the buffer, and wherein the buffer comprises a maximum capacity for storing network packets;
    store the plurality of network packets in the buffer at least above the low water mark threshold and below the maximum capacity;
    remove packets from the buffer;
    transmit the removed packets via a downstream link to an associated destination; and
    in response to removing packets from the buffer such that the buffer's capacity falls below the low water mark threshold, receive additional packets and storing the additional packets at least above the low water mark threshold and below the maximum capacity.

17. The non-transitory machine-readable storage medium for enhancing prefetching operations of claim 16, wherein the sets of instructions when further executed by the machine, cause the machine to:
    determine a bandwidth of a downstream link; and
    determine a compression algorithm being used on the downstream link.

18. The non-transitory machine-readable storage medium for enhancing prefetching operations of claim 16, wherein the sets of instructions when further executed by the machine, cause the machine to based on at least one of: the determined bandwidth, the determined time-out value, and the determined compression algorithm, set the low watermark threshold of the buffer.

* * * * *